(12) United States Patent
Seki

(10) Patent No.: US 7,171,541 B1
(45) Date of Patent: Jan. 30, 2007

(54) REGISTER RENAMING SYSTEM

(76) Inventor: Hajime Seki, 4-38, Dougo-kita-machi, Matsuyama-shi, Ehime, 790-0848 (JP)

( * ) Notice: Subject to any disclaimer, the term of this patent is extended or adjusted under 35 U.S.C. 154(b) by 654 days.

(21) Appl. No.: 10/069,987

(22) PCT Filed: Sep. 6, 2000

(86) PCT No.: PCT/JP00/06070

§ 371 (c)(1),
(2), (4) Date: Mar. 8, 2002

(87) PCT Pub. No.: WO01/18645

PCT Pub. Date: Mar. 15, 2001

(30) Foreign Application Priority Data

Sep. 8, 1999 (JP) ................................. 11/254149

(51) Int. Cl.
*G06F 12/02* (2006.01)
(52) U.S. Cl. ........................................ 712/23; 712/216
(58) Field of Classification Search .................. 712/22, 712/23, 216, 217
See application file for complete search history.

(56) References Cited

U.S. PATENT DOCUMENTS

| | | | | |
|---|---|---|---|---|
| 4,992,938 A | * | 2/1991 | Cocke et al. ................ | 712/217 |
| 5,694,564 A | * | 12/1997 | Alsup et al. ................ | 712/216 |
| 5,751,985 A | * | 5/1998 | Shen et al. .................. | 712/218 |
| 5,893,145 A | * | 4/1999 | Thayer et al. ............... | 711/125 |
| 5,919,256 A | * | 7/1999 | Widigen et al. ............. | 712/218 |
| 6,185,671 B1 | * | 2/2001 | Pentovski et al. ........... | 712/216 |
| 6,311,261 B1 | * | 10/2001 | Chamdani et al. ............ | 712/23 |
| 6,442,677 B1 | * | 8/2002 | Meyer et al. ................ | 712/216 |

FOREIGN PATENT DOCUMENTS

| | | | | |
|---|---|---|---|---|
| JP | 6149569 | | * | 5/1994 |
| JP | 6-230961 | A | * | 8/1994 |
| JP | 2000-172505 | A | * | 6/2000 |
| JP | 11-184696 | A | * | 7/2000 |

OTHER PUBLICATIONS

Glenn Reinman etal., Classifying Load and Store Instructions for Memory Renaming, Proceedings of the 13th International conference on Supercomputing, May 1999, ACM Press pp. 399-407.*
Mayan Moudgill etal., Register Renaming and Dynamic Speculation: an Alternative Approach, 1993 IEEE, pp. 202-213.*

* cited by examiner

*Primary Examiner*—Eric Coleman
(74) *Attorney, Agent, or Firm*—Bacon & Thomas

(57) ABSTRACT

A register renaming system for a processor based on superscalar architecture that can process a larger number of instructions per cycle by providing a free list to hold unallocated physical-register numbers and a mapping table whose entries are provided in respective correspondence with the logical registers and each designed to hold a physical-register number, and by pipelining where dependency checks among instructions are to be done as a pre-process.

3 Claims, 2 Drawing Sheets

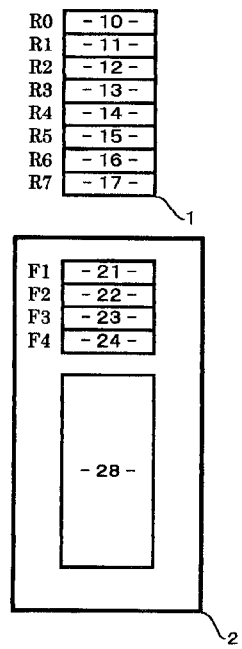

| R0 | - 10 - |
| R1 | - 11 - |
| R2 | - 12 - |
| R3 | - 13 - |
| R4 | - 14 - |
| R5 | - 15 - |
| R6 | - 16 - |
| R7 | - 17 - |

| F1 | - 21 - |
| F2 | - 22 - |
| F3 | - 23 - |
| F4 | - 24 - |

| | |
|---|---|
| R0 | P18 |
| R1 | P03 |
| R2 | P22 |
| R3 | P29 |
| R4 | P05 |
| R5 | P07 |
| R6 | P25 |
| R7 | P12 |

| | |
|---|---|
| F1 | P19 |
| F2 | P08 |
| F3 | P27 |
| F4 | P21 |

(B)

| | |
|---|---|
| R0 | P21 |
| R1 | P08 |
| R2 | P22 |
| R3 | P29 |
| R4 | P05 |
| R5 | P07 |
| R6 | P25 |
| R7 | P12 |

| | |
|---|---|
| F1 | P31 |
| F2 | P01 |
| F3 | P17 |
| F4 | P14 |

*Fig.2*

REGISTER RENAMING SYSTEM

FIELD OF THE INVENTION

The present invention relates to a register renaming system that can process a large number of instructions per clock cycle in a processor based on superscalar architecture capable of out-of-order execution.

DESCRIPTION OF THE PRIOR ART

A processor based on superscalar architecture capable of out-of-order execution is equipped with physical registers, the number of which is greater than that of the logical registers prescribed by the architecture. And the technique of dynamic register renaming is applied.

Namely, in each cycle, dependency checks are made by comparing the logical-register numbers shown as operands in the instructions, and the logical-register numbers are respectively renamed to appropriate physical-register numbers so that the dependencies would be dissolved.

For incarnation of register renaming, a technique utilizing a reorder buffer and a technique utilizing a mapping table are known. The technique utilizing a reorder buffer is adopted, for example, for the Pentium[™] processor, available from Intel Corporation of Santa Clara, Calif. USA. The technique utilizing a mapping table is described in Keller, R. M. "Look-Ahead Processors." Computing Surveys, Vol. 7, no. 4 (December 1975), pp. 177–195, and is adopted, for example, for R10000[™] processor, available from MIPS Technologies, Inc. of Mountain View, Calif. USA.

When compared with the technique utilizing a reorder buffer, the technique utilizing a mapping table should introduce one more pipeline stage to access the mapping table. But, the logical circuit for checking dependencies among instructions can be relatively simplified.

In regard to superscalar processors, it is desired to enhance performance by streamlining register renaming and decoding/issuing a larger number of instructions per cycle.

However, there has been a problem that it is difficult to increase the number of instructions that go through the process of register renaming per cycle beyond the current level, because it requires an extremely massive logical circuit.

The present invention has been proposed with a view to solving the foregoing problem. Its object is to provide a register renaming system whereby the number of instructions that can be processed per cycle could be increased beyond the current level.

SUMMARY OF THE INVENTION

The processor in which the register renaming system according to the present invention is incorporated comprises a free list that holds free, namely, unallocated physical-register numbers, and a mapping table whose entries are provided in respective correspondence with the logical registers and each designed to hold a physical-register number.

By means of the register renaming system according to the present invention, a larger number of instructions could be processed per cycle owing to pipelining where dependency checks among instructions are to be done as a pre-process.

To begin with, in regard to a group of instructions that are to go through the process of register renaming simultaneously, the pre-process is done as follows.

(a) Each logical-register number shown as a destination operand is marked with a tag that corresponds to the order of the instruction. These tags are labels that, in the later stage, are to be replaced by physical-register numbers that are taken out of the free list and allocated.

(b) Each logical-register number shown as a source operand that is RAW (read-after-write) [WAR (write-after-read)] dependent on an instruction that goes through the process of register renaming simultaneously is marked with the same tag that is being marked on the destination operand of the instruction on which it is dependent.

After the above pre-process, the logical-register numbers shown as operands in the group of instructions are respectively renamed to appropriate physical-register numbers. Each logical-register number on which a tag is marked is renamed to the physical-register number that is to be taken out of the free list and allocated in correspondence with the marked tag. Each logical-register number on which no tag is marked is renamed to the physical-register number that is to be obtained by accessing the mapping table.

In the same cycle, the contents of the mapping table are updated. Namely, contents of entries of the mapping table that correspond to logical-register numbers shown as destination operands in the group of instructions are respectively altered to physical-register numbers that are to be allocated in correspondence with the marked tags. In the case that the same logical-register number is shown as destination operand in a plurality of instructions, the alteration concerning the last in the order of instructions is validated.

As above, taking two stages, namely, by pipelining, it may be possible to have a larger number of instructions go through the process of register renaming per cycle with a relatively simple circuit.

BRIEF DESCRIPTION OF THE DRAWINGS

FIG. 1 is a block diagram of a piece of hardware that is needed for incarnation of the register renaming system according to the present invention; and FIG. 2 shows contents of the mapping table and F registers, in the course of an example process of register renaming regarding a sequence of instructions in the embodiment of the present invention.

PREFERRED EMBODIMENTS OF THE INVENTION

In the following, a preferred embodiment that materializes the register renaming system according to the present invention will be described referring to the figures. Now, the later-described processor in which the register renaming system according to the present invention is incorporated is a RISC machine that is assumed to have 8 logical registers R0, R1, . . . R7 on the architecture, furnished with 32 physical registers P00, P01, . . . P31 in hardware, and so structured as to be able to have up to four instructions go through the process of register renaming per cycle.

FIG. 1 is a block diagram of a piece of hardware that is needed for incarnation of the register renaming system according to the present invention. Shown in FIG. 1 are a mapping table 1 and a free list 2.

Described below is the detailed structure of each of the above-mentioned components.

(A) Mapping Table (MT)

As shown in FIG. 1, in this embodiment, the mapping table (hereafter, it will be referred to as the MT) 1 has eight entries 10–17 provided in respective correspondence with logical registers R0, R1, . . . R7. Each MT entry is designed to hold a physical-register number.

(B) Free List (FL)

The free list (hereafter, it will be referred to as the FL) holds numbers of free, namely, unallocated physical registers.

In the case that a free physical register is to be allocated, a free physical-register number is taken out of the FL. Conversely, when a physical register is to be released from allocation, the number of the physical register gets to be registered on the FL.

As shown in FIG. 1, in this embodiment, FL 2 comprises F registers 21, 22, 23, 24 and a register file 28.

Each of the F registers is designed to hold a physical-register number. It is from F registers that free physical-register numbers are to be taken out of the FL. Namely, F registers are needed as many as instructions that go through the process of register renaming in a cycle. So, the processor of this embodiment is furnished with four F registers F1, F2, F3, and F4.

The register file 28 in the FL, each entry of which is designed to hold a physical-register number, is utilized to construct a circular FIFO queue. Namely, the numbers of physical registers that are being released from allocation are to be enqueued, and physical-register numbers are to be supplemented from the head of the queue to F registers out of which physical-register numbers are being taken.

Described below is the process of register renaming in this embodiment.

In this embodiment, register renaming is carried out through two stages (1) pre-process, and (2) execution of register renaming and updating of the MT. The action in each stage is described below.

(1) Pre-Process

In regard to a group of instructions that are to go through the process of register renaming simultaneously, the pre-process is done as follows.

(1a) Logical-register numbers shown as destination operands are respectively marked with tags @1, @2, . . . , each corresponding to the order of instruction. In this embodiment, tags @1, @2, @3, @4 respectively correspond to F registers F1, F2, F3, F4 in the FL.

(1b) Each logical-register number shown as a source operand that is [WAR (write-after-read)] RAW (read-after-write) dependent on an instruction that goes through the process of register renaming simultaneously is marked with the same tag that is being marked on the destination operand of the instruction on which it is dependent. Namely, in regard to each of the instructions after the first one, each logical-register number shown as a source operand is compared with logical-register number(s) shown as destination operand(s) in the foregoing instruction(s). If matched, the same tag is marked on it. In the case that a plurality of matches come out, the tag concerning the last in the order of instructions is selected.

(2) Execution of Register Renaming and Updating of the MT

After the above-mentioned pre-process, the logical-register numbers shown as operands in the group of instructions are respectively renamed to appropriate physical-register numbers, and contents of the MT are updated. To put it in the concrete, the following process is carried out.

(2a) Each logical-register number on which a tag is marked is renamed to the physical-register number that is to be taken out of the FL and allocated in correspondence with the marked tag. Each logical-register number on which no tag is marked is renamed to the physical-register number that is to be obtained by accessing the MT.

(2b) Contents of MT entries that correspond to logical-register numbers shown as destination operands in the group of instructions are respectively altered to physical-register numbers that are to be allocated in correspondence with the marked tags. In the case that the same logical-register number is shown as destination operand in a plurality of instructions, the alteration concerning the last in the order of instructions is validated.

And, this concludes a general description of the process of register renaming in this embodiment. Next, an example action is described below. Now, let's consider having the following four instructions go through the process of register renaming in the processor of this embodiment.

Instruction1 mul R0, R1, R2; R0=R1\*R2
Instruction2 mul R1, R3, R4; R1=R3\*R4
Instruction3 add R0, R0, R1; R0=R0+R1
Instruction4 div R0, R0, R5; R0=R0/R5

Assuming that registers R1, R2, R3, R4, R5 are to respectively hold data D1, D2, D3, D4, D5 according to the foregoing instructions, the above sequence of instructions is to compute $\{(D1*D2)+(D3*D4)\}/D5$ and store it into register R0.

In the following, the process of register renaming regarding the above sequence of instructions in the processor of this embodiment is described in detail.

To begin with, the pre-process for register renaming is done as follows.

Instruction1 mul R0(@1), R1(none), R2(none)
Instruction2 mul R1(@2), R3(none), R4(none)
Instruction3 add R0(@3), R0(@1), R1(@2)
Instruction4 div R0(@4), R0(@3), R5(none)

Namely, destination register operands, which are each shown right after the operation code in the instruction, are respectively marked with tags @1, @2, @3, @4 in order.

In regard to each of the instructions after the first one, each source register operand is compared with destination register operand(s) of the foregoing instruction(s). If matched, the same tag is marked on it. In the case that a plurality of matches come out, the tag concerning the last in the order of instructions is selected.

In regard to Instruction1, no tag is marked on the source operands. But, in practice, a default tag (e.g. @0) may be marked on "no-tag-marked" source operands.

In regard to Instruction2, each source operand is compared with destination operand R0 of Instruction1. In this case, because no match comes out, no tag is marked on them.

In regard to Instruction3, each source operand is compared with the destination operands of Instruction1 and 2. In this case, because the 1st and 2nd source operand are matched with the destination operands of Instruction1 and 2 respectively, tags @1 and @2 are respectively marked on them.

In regard to Instruction4, each source operand is compared with the destination operands of Instruction1, 2 and 3. In this case, because the 1st source operand is matched with the destination operands of Instruction1 and 3, tag @3, which corresponds to the latter—Instruction3—, is marked on it.

By implementing an appropriate circuit, the pre-process for register renaming such as above is performed in a cycle.

In the next cycle, execution of register renaming and updating of the MT are performed. Now, let's suppose that contents of the MT and F registers in the FL at this moment are as shown in FIG. 2(A).

Each register operand on which a tag is marked is renamed to the physical-register number that is taken out of the FL and allocated in correspondence with the marked tag. And, each register operand on which no tag is marked is renamed to the physical-register number that is obtained by accessing the MT by the logical-register number. Then, the given sequence of instructions is converted into the following.

Instruction1 mul P19, P03, P22
Instruction2 mul P08, P29, P05
Instruction3 add P27, P19, P08
Instruction4 div P21, P27, P07

Besides, contents of the MT entries that correspond to destination operands of Instruction1–4 are respectively altered to physical-register numbers that are allocated in correspondence with the marked tags. Hereupon, as shown in FIG. 2(B), contents of the MT entries that correspond to R0 and R1 are altered to P21 and P08 respectively. As to R0, P19, P27 and P21 are allocated triply, and the last one—P21—is written into the MT. Moreover, as shown in FIG. 2(B), free physical-register numbers P31, P01, P17, P14 are respectively supplemented to the F registers, out of which physical-register numbers have been taken out.

And, this concludes the process of register renaming regarding the given sequence of instructions in the processor of this embodiment.

Besides, the system might be so structured that the correspondence between logical-register numbers and tags regarding updating of the mapping table is determined in the pre-process stage. Namely, in the case that the same logical-register number is shown as destination operand in a plurality of instructions that go through the process of register renaming simultaneously, each of said plurality of instructions except the last one is invalidated in regard to updating of the mapping table in the pre-process stage.

For example, the following determination is made in the pre-process stage in regard to the above-mentioned example action.

Instruction1 R0→@1: invalid
Instruction2 R1→@2 valid
Instruction3 R0→@3: invalid
Instruction4 R0→@4: valid And, in the next cycle, for each validated alteration, writing of the physical-register number allocated in correspondence with the marked tag is enabled.

As above, by also introducing a pre-process regarding updating of the mapping table, further simplification of the circuit may be attained.

INDUSTRIAL UTILITY

As above, by means of the register renaming system of the present invention, owing to pipelining where dependency checks among instructions are to be done as a pre-process, it may be possible to process a larger number of instructions per cycle with a relatively simple circuit.

What is claimed is:

1. A method for performing a register renaming in a pipelined manner, for each group of instructions that are to go through a process of register renaming simultaneously, in a microprocessor based on superscalar architecture capable of out-of-order execution, comprising: physical registers; a free list that is designed to hold unallocated physical-register numbers; and a mapping table having entries that are provided in respective correspondence with a predetermined number of logical registers, the entries being each designed to hold a physical-register number, the method comprising the steps of:
    (a) associating each logical-register number shown as a destination operand with a tag based on order of the instructions in the group, and associating each logical-register number shown as a source operand that is RAW (read-after-write) dependent on an instruction of the group with the same tag with which the destination operand of said instruction is being associated; and
    (b) renaming each logical-register number associated with a tag to the physical-register number that is taken out of the free list and is allocated in correspondence with the associated tag, renaming each logical-register number associated with no tag to the physical-register number that is obtained by accessing the mapping table, and updating the mapping table in accordance with the group of instructions.

2. The method for performing register renaming according to claim 1;
    wherein both step (a) and step (b) take one cycle.

3. The method for performing register renaming according to claim 1;
    wherein step (a) takes multiple cycles, and step (b) takes one cycle.

* * * * *